US008965287B2

(12) United States Patent
Lam

(10) Patent No.: US 8,965,287 B2
(45) Date of Patent: Feb. 24, 2015

(54) BATTERY POWERED PASSIVE KEYLESS ENTRY SYSTEM FOR PREMISE ENTRY

(76) Inventor: Tony Lam, Walnut, CA (US)

( * ) Notice: Subject to any disclaimer, the term of this patent is extended or adjusted under 35 U.S.C. 154(b) by 310 days.

(21) Appl. No.: 13/437,651

(22) Filed: Apr. 2, 2012

(65) Prior Publication Data

US 2012/0252365 A1 Oct. 4, 2012

Related U.S. Application Data

(60) Provisional application No. 61/471,091, filed on Apr. 1, 2011.

(51) Int. Cl.
*H04B 7/00* (2006.01)
*G07C 9/00* (2006.01)

(52) U.S. Cl.
CPC .. *G07C 9/00309* (2013.01); *G07C 2009/00587* (2013.01)
USPC .......................................................... 455/41.2

(58) Field of Classification Search
CPC ...... H04W 12/06; H04W 12/08; H04W 12/10
USPC .......................................................... 455/41.2
See application file for complete search history.

(56) References Cited

U.S. PATENT DOCUMENTS

| | | | | |
|---|---|---|---|---|
| 7,602,274 | B2 * | 10/2009 | Lee et al. | 340/10.2 |
| 7,664,464 | B2 * | 2/2010 | Gerstenkorn | 455/41.2 |
| 8,164,416 | B2 * | 4/2012 | Lee et al. | 340/5.6 |
| 8,629,763 | B2 * | 1/2014 | Hagl et al. | 340/10.3 |
| 2001/0033222 | A1 * | 10/2001 | Nowottnick et al. | 340/5.61 |
| 2005/0237163 | A1 * | 10/2005 | Lee et al. | 340/10.51 |
| 2009/0256674 | A1 * | 10/2009 | Lee et al. | 340/5.6 |
| 2010/0141389 | A1 * | 6/2010 | Hagl et al. | 340/10.1 |
| 2010/0321203 | A1 * | 12/2010 | Tieman et al. | 340/870.01 |

* cited by examiner

*Primary Examiner* — April G Gonzales
(74) *Attorney, Agent, or Firm* — Tsz Lung Yeung

(57) ABSTRACT

A passive keyless entry (PKE) system, comprising a DC power source and a base station with a housing that includes a first portion being made of a first material that shields radio frequency (RF) signaling and a second portion being made of a second material that permits RF signaling, is particularly adapted for premise entry and is designed to be powered by common household batteries to unlock a premise door as a user approaches within a prescribed arms-length distance from the premise door. The PKE system further comprises a printed circuit board and a low frequency (LF) emitting antenna coil positioned both perpendicular to the printed circuit board and behind the second material of the housing while having a center axis oriented in a horizontal orientation. The LF emitting antenna coil transmits a LF interrogating signal upon detecting a user within the prescribed arms-length distance from the base station.

15 Claims, 6 Drawing Sheets

BATTERY POWERED PASSIVE KEYLESS ENTRY SYSTEM FOR PREMISE ENTRY

CROSS REFERENCE TO RELATED APPLICATIONS

This application claims the benefit pursuant to 35 U.S.C. 119(e) of U.S. Provisional Application No. 61/471,091, filed Apr. 1, 2011, which application is specifically incorporated herein, in its entirety, by reference.

FIELD

The embodiments of the present invention relate to a passive keyless entry system, specifically a passive keyless entry system that is particularly adapted for premise entry and designed to be powered by a portable power source, such as commonly available household batteries, to unlock a door of a premise as a user approaches within a prescribed distance (e.g. one-half to one meter) of the door.

BACKGROUND

Passages have been traditionally secured by the use of doors affixed with a lock that permits entry by authorized users. Locks are mostly mechanical devices that can be opened by inserting a key into the lock lock's keyway and rotating the key. This requires the user to first locate and acquire the key and then perform a mechanical action in order to gain entry.

More recently, various types of keyless entry systems have been used to simplify entry by authorized users. There are generally two types of keyless entry systems—a non-passive keyless entry system and a passive keyless entry system. A non-passive keyless entry system comprises a base station and a portable data carrier configured to allow access to unlock a secured door, but such access requires the user to perform an authenticating action such as pressing a button on a key fob, swiping a key card through a card reader or positioning a smart card, chip card or data token in close proximity to and practically touching a proximity reader in order to gain entry.

For instance, one type of non-passive keyless entry system, such as a Remote Keyless Entry (RKE) system, is commonly deployed in automobiles for vehicular door locking and unlocking without inserting the car key into the vehicle's door lock. In the RKE system, a user must first locate and acquire the key fob and has to press a button on the key fob in order to open the car door or to unlock the vehicle's trunk.

A more recent evolution for vehicular entry has been the deployment of a Passive Keyless Entry (PKE) system. The vehicular PKE system also comprises a base station and a portable data carrier (e.g., a key fob) configured to allow access to unlock a secured vehicular opening, but such access does not require the user to perform an active authenticating action. Rather, entry can be gained when a user carrying a key fob approaches the vehicle where the vehicle's LF emitting antennas, positioned external to the vehicle's chassis where RF communication shielding is not a problem, detect the key fob.

The placement of the vehicular LF emitting antennas situated external to a tamper-resistant chassis is unsuitable for many non-vehicular secured access applications. Another disadvantage of the vehicular RKE and PKE systems is that the vehicular door locks and the electronic circuitries inside the vehicle that control the vehicular locking and unlocking functions are powered by the car's battery. Upon a complete discharge of the vehicle's battery, the car owner will no longer be able to gain entry to the vehicle or access its contents. Vehicular batteries are not ubiquitous, and thus, most people will not have a spare and fully charged car battery lying around. Obtaining and installing a suitably rated car battery for a particular make and model of a vehicle, especially after business hours, can be a real challenge.

Another disadvantage of the vehicular RKE and PKE systems is that the authorizing access codes of these vehicular systems are set by the vehicle manufacturers, where each key fob is paired with a specific vehicle and no one key fob will operate any vehicle other than the paired vehicle. A husband and wife couple having two different cars will each have to carry two different key fobs in order to access the two vehicles. The more vehicles one family has the more key fobs a family member has to use in order to access the vehicles. While this unique key fob to vehicle pairing provides a certain level of vehicular security, it is inconvenient for users having multiple vehicles, perhaps stored at different locations, to have to carry multiple key fobs and to fumble through several different key fobs to realize the matching key fob for the intended vehicle.

Another disadvantage of the vehicular RKE and PKE systems and other premise base entry systems such as garage door opening systems that rely on hopping or rolling codes, the base station of these systems using an encoder generates a new code each time when transmitting an access code. The portable data carrier after receiving the access code uses the same encoder to generate a new code that will be accepted by the base station in the future. Though the use of hopping or rolling codes prevents perpetrators from scanning and recording the access code and replaying it to open the door, there is a probability that the open button on the portable data carrier can be pressed inadvertently or accidentally while the portable data carrier is not in the transmission and reception range of the base station. This creates the possibility of desynchronizing the access code, even if the portable data carrier generates look-a-head codes ahead of time, there remains the possibility that the number of inadvertent or accidental pushes of the open button of the portable data carrier exceeds the number of look-a-head codes generated and the user would then be prevented from access.

Further, even if a user becomes aware that such a vehicular RKE and PKE systems or other premise base entry systems such as garage door opening systems has been compromised, there are no immediate steps that the user can take to rectify the security breach other than having the security system reprogrammed by the system's administrator or manufacturer. Technicians and dealers allowed to handle the reprogramming of these systems usually require the use of special tools generally not available to users of these systems to reprogram their key fobs; depending on the make and model of the vehicle or the premise base system, the cost of replacing a missing or stolen key fob and the reprogramming of the security system could amount to hundreds of dollars.

Aside from the replacement and the reprogramming expenditures, there is the inconvenience of contacting and waiting for the manufacturer or the dealer to have the key fob and the security system reprogrammed. The vehicular RKE systems and systems such as garage door opening systems also require the user to press a button on the key fob or the portable data carrier, and therefore, do not offer the benefit of the passive keyless entry system where no active authenticating actions are required in order to gain entry.

Another disadvantage of the vehicular RKE and PKE systems and similar non-vehicular access control systems that use portable data carriers similar to a key fob is that the door unlock button on the key fob can be depressed inadvertently or unintentionally and without the user's knowledge triggering the unlocking of the vehicle or the premise door; this unintended and unaware unlocking of the vehicle or the premise door can post security threats to person and property.

Another disadvantage of the vehicular RKE and PKE system and similar non-vehicular access control systems is that the panic button on the key fob can also be depressed inadvertently triggering an undesired alarm siren causing anxiety to the user and unwanted disturbance and annoyance to neighbors. False alarms caused by the inadvertent pressing of buttons on the key fob also results in additional drain on the key fob battery and the base station battery and can reduce the system's effectiveness prematurely.

Other than the vehicular RKE and PKE systems, there is a variety of premise-based keyless entry systems. There are systems that use infrared as a wireless communication medium between the base station and the portable data carrier. However, even though such systems do not require the inserting of a key into a door lock's keyway, these systems still require the user to physically locate and acquire the portable data carrier from the user's person or from the user's belonging; the user also has to point the portable data carrier's infrared beam at the base station's infrared reception sensor. The infrared beams used in such systems are very directional. They travel in straight lines and can be reflected or blocked, and like the pointing of a TV remote control, the user has to point the infrared beam pretty much directly at the base station's infrared sensor. The infrared transmission and reception can also be made less effective if the portable data carrier's infrared transmitter aperture or the base station's infrared reception sensor is soiled with dirt or other contaminants. The inconvenience of using IR base keyless entry systems where the user must first locate, acquire and press a button on the infrared transmitter prior to unlocking will be more apparent when the systems are used in the dark, in bad weather, when the user's hands are occupied with carrying groceries and belongings or when the user is holding an infant or a young child.

There are premise-based keyless entry systems that use ultrasound instead of infrared as a wireless communication medium between the base station and the portable data carrier. These systems also have the same disadvantage of requiring the user to physically locate and acquire the portable data carrier from the user's person or from the user's belonging. Furthermore, the user has to press a button on the ultrasound transmitter in order to achieve any unlocking. The inconvenience of using such ultrasound-based systems is similarly apparent when these systems are used in the dark, in poor weather, when the user's hands are occupied with holding a mobile phone or carrying things or when the user is carrying an infant or holding a baby.

There are other keyless premise entry systems that use key cards, smart cards, chip cards, tokens, or key fobs in conjunction with card readers or proximity readers. There are disadvantages in these systems as well. These systems generally are not passive keyless entry systems and their proximity detection ranges are generally very limited, usually no more than 20 to 30 millimeters (mm). Again, the mode of entry of these systems is not truly passive; rather, these systems will require a user to physically locate and acquire the portable data carrier (e.g., a key card, smart card, chip card, token or key fob) from the user's person or belonging, thereafter, the user is required to perform an authentication action such as swiping the key card through a card reader or position the smart card, chip card, token or key fob in close proximity to and practically touching the proximity reader in order to gain access.

There are RFID systems that provide keyless entry but the mode of entry is also not passive keyless. Again, a user is required to locate and acquire the portable data carrier and position the portable data carrier in very close proximity to and practically touching a proximity reader in order to gain entry.

There are RFID systems that are outdoors such as toll road systems and gate systems that are passive and have much greater RFID detection ranges. However, the dimensions of these systems are much larger compared to a typical keyless premise entry system because these systems require a larger or a multiple number of RF emitting antennas in order to achieve the greater detection distances. Also, these systems and other keyless access control systems aforementioned generally are powered externally and will require professional wiring and installation. The cost of labor and material in installing and maintaining these systems is another disadvantage.

There are also biometric entry systems that use fingerprints, palm prints, face recognition, voice recognition and iris scanning for access control and authentication. These systems require the enrollment of all of the users' credentials and have to acquire all the necessary biometric data prior to authentication. Similar to other non-passive keyless entry system, biometric entry systems are also non-passive entry systems and generally all biometric entry systems will require a user to perform an authenticating action before access can be granted. There are also additional disadvantages of the biometric entry systems, replacing biometric credentials is much more laborious and difficult if not impossible. If someone's face is compromised from a database, the compromised face credential cannot be replaced with a different face to authenticate the same person in granting access. A user wearing gloves in cold climate areas will have to remove the glove in order to use a fingerprint-based biometric entry system. The collection of biometric data will require the physical presence of every individual seeking access, there will be no guest entry possible if such a guest was not previously enrolled in the biometric system. The biometric recognition can also be made less effective if the biometric data acquiring device's surface or sensor is soiled with dirt or other contaminants or smudged with fingerprints from unclean hands or from hands with greasy lotions. Snow and rain can also obfuscate the detection surface and can make authentication less accurate or less effective. Further, biometric data acquisition and measurement equipment are expensive compared to other types of keyless entry systems. Finally, the ultimate disadvantage of such biometric systems is one of circumvention and personal safety. When criminals cannot get access to secured properties, there is a chance that the villains will stalk and assault the premise owner to gain access. If the premise is secured with a biometric system, the damage to the owner could be irreversible and potentially cost more than the secured property.

In summary, infrared, ultrasound, biometric and RFID systems as well as other premise-based systems that use key cards, smart cards, chip cards, tokens, or key fobs are all non-passive systems. These systems generally require a user to physically locate and acquire a portable authentication device from the user's person or belonging and to perform an authenticating action in order to gain entry. Thus, the convenience provided by such systems versus a conventional key and lock arrangement is not substantially improved.

Achieving a PKE proximity detection distance within a prescribed range (e.g., one-half meter to approximately one meter) and overcoming RF transmission and reception shielding effects that would be caused by encasing RF transmission and reception elements within a tamper resistant but ferromagnetic or electromagnetic RF shielding material has been the key challenges in developing a premise-based PKE system.

More specifically, the current flowing into a low frequency (LF) emitting antenna coil used in a PKE system radiates a near-field magnetic field that falls off with $1/r^3$ where "r" is the distance from the center of the LF emitting antenna coil. The magnetic field strength or the magnetic flux density from the magnetic field generated is therefore inversely proportional to the cube of the distance and decays with $1/r^3$. Thus, the effective proximity detection distance between the base station and the remote transponder in a PKE system will correspondingly decline in an exponential fashion as the distance between the base station and the remote transponder increases.

In addition, the transmission and the reception of RF signals, a form of electromagnetic radiation, by an antenna encased inside a ferromagnetic or conductive cage can be greatly attenuated or even completely blocked by the cage itself evidenced by the Faraday's cage effect. The main culprit in the reduction in the proximity detection distance of a PKE system lies with the Faraday's cage effect where the Faraday's cage shields the interior of a conductive casing from outgoing and incoming electromagnetic radiation if the conductive casing is thick enough and any holes of the casing are significantly smaller than the radiation's wavelength.

In the vehicular PKE systems, the LF emitting antennas are usually housed inside the exterior vehicular door handles or in areas of the vehicle where electromagnetic shielding is not a problem. In a premise-based PKE system, the Faraday's cage effect of electromagnetic shielding will become apparent and difficult to overcome when the RF communication elements of the PKE system such as the LF emitting antenna and the UHF receiver are housed in enclosures constituted with tamper resistant but electromagnetic interfering or shielding material. Furthermore, any conversions of the mechanism supplying power to such systems, such as the substitution of an alternating current (AC) power supply by a direct current (DC) power supply, and the miniaturization of the LF emitting and receiving antennas would further reduce the effective proximity detection distances of any PKE systems.

Evidently, implementing a passive keyless entry system where the LF emitting antenna and the UHF receiver have to be housed within ferromagnetic or electromagnetic RF shielding material, because of material strength required for maintaining system integrity, becomes problematic and presents a formidable challenge.

SUMMARY

A passive keyless entry system includes a sensing mechanism that detects a user and initiates RF communications with a portable authentication device when the user approaches a door and engages an unlocking mechanism arranged on the door. The sensing mechanism may be an electromechanical switch incorporated into the unlocking mechanism. The passive keyless entry system further includes a transmitter to transmit an interrogating signal, which may be a low frequency interrogating signal, when the user is detected. Also, the system includes a receiver to receive a response signal, which may be an ultra-high frequency response signal, in response to the interrogating signal and an unlocking mechanism to selectively unlock the door when the response signal is authenticated. The response signal may include an encrypted identification response payload that is decrypted when authenticating the response signal.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

REFERENCE NUMERALS

Figure 1:
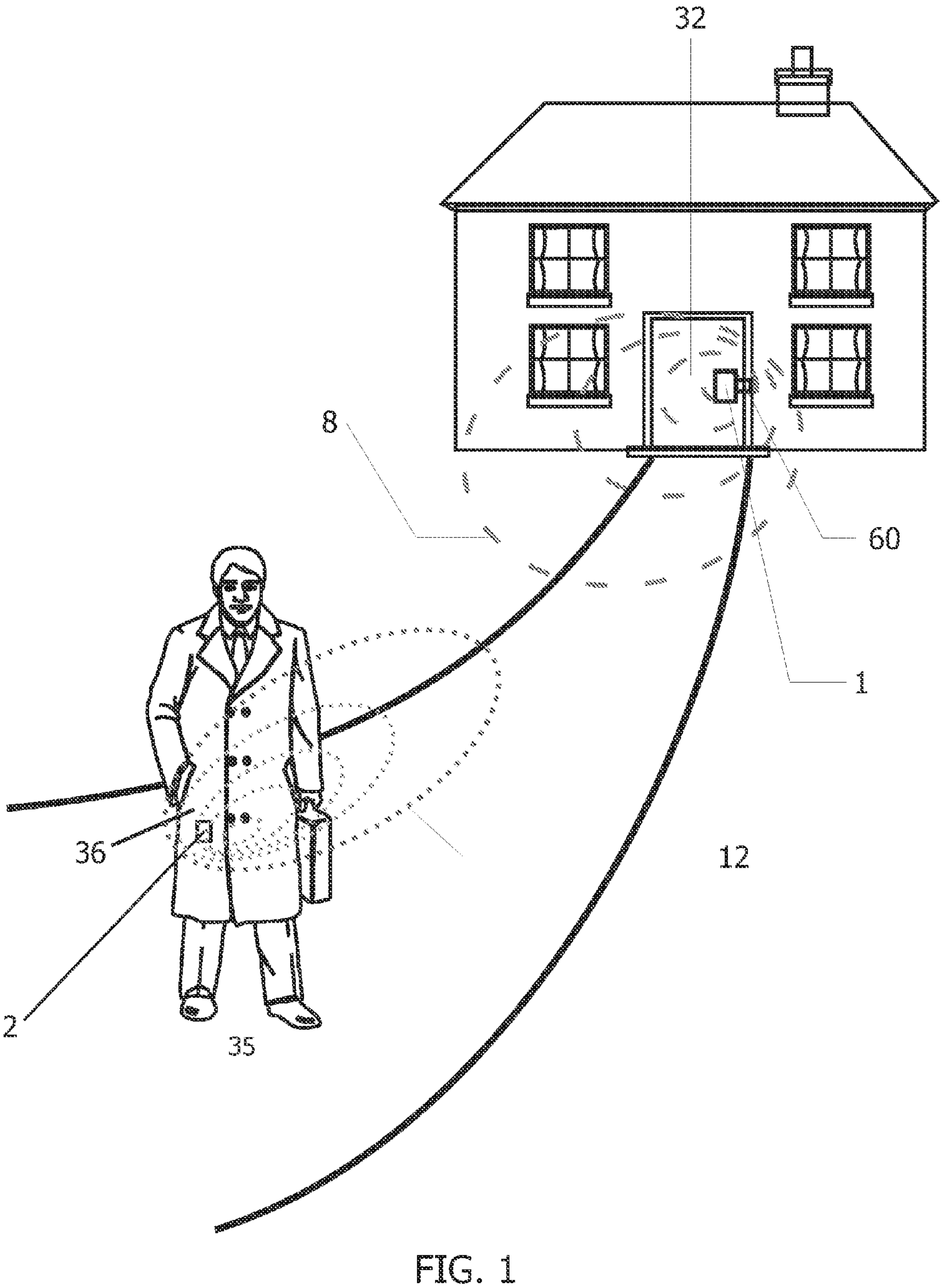
FIG. 1 is an illustrative view of an exemplary embodiment of a premise-base passive keyless entry system.

1. Base Station
2. Remote Transponder
3. LF Transmitter
4*a*. LF Emitting Antenna Coil
4*b*. LF Receiving Antenna Coil
5. Antenna Driver
6. Control and Authentication Module
7. UHF Receiver
8. LF Interrogating Signal
9. LF Receiver
10. UHF Transmitter
11. MCU (Microcontroller Unit)
12. UHF Response Signal
32. Door
35. User Carrying a Remote Transponder
36. Pants Pocket (Hidden)
41. Residence (Home)

42*a*. Business
42*b*. Office Building
43. Warehouse
44. Production Facility
49. Watercraft or Sea Vessel
50. Tool Shed
51. Lock Housing
52. Digital Keypad
53. Unlocking Mechanism (Door Knob/Lever/Latch/Button)
54. Keyway
55. Battery Level Indicator
56. Battery Housing (Dotted Line)
57. Thumb Turn
58*a*. Common Household Batteries
58*b*. Lithium 3 v Coin Cell Battery
58*c*. Small Micro Batteries
59. Rectangular Housing
60. Securing Means (A Deadbolt or a Latch Bolt or an Electrified or a Magnetic Locking Mechanism)
61. Motor or Solenoid
62. Door Lock Status Indicator
70. Cylindrical Housing
72. Ferrite-Core Antenna arranged in x-axis
73. Ferrite-Core Antenna arranged in y-axis
74. Air-Core Antenna arranged in z-axis
80. External 9V Battery Terminal
91. Access Code Registration Button
92. Transponder Registration Button
101. Tiny Recessed Button for Pairing with Base Station
102. Electromechanical Switch
103. Printed Circuit Board (PCB)
104. Tamper Resistant Encapsulant
105. LF Emitting Antenna Coil Axis

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

To overcome the difficulties and limitations of the prior passive keyless entry systems and other keyless entry systems examined previously, one embodiment of the invention is directed to a passive keyless entry system that is powered by inexpensive common household batteries and is particularly adapted for premise entry. This premise-based passive keyless entry system permits a proximity detection distance of an arms-length, that is generally within a range of one-half meter to approximately one meter, to permit a user to gain entry to a secured premise in a convenient and true passive keyless fashion without requiring the user to first locate and acquire a portable authentication device and then perform an authenticating action in order to gain entry.

According to one embodiment, the premise-based passive keyless entry system comprises a base station and a remote transponder. The base station and the remote transponder jointly serve as communication peers, establishing RF (radio frequency) communication links between the base station and the remote transponder to unlock a door (a barrier of entry) upon authentication of the remote transponder by the base station. The premise-based passive keyless entry system allows the base station to be powered by common household batteries and the base station can be paired with a single or multiple remote transponders each having its own unique identifier, thereby permitting the use of a single remote transponder to unlock multiple doors.

As described below, one or more embodiments of the invention overcome a number of the difficulties and challenges exhibited by the prior passive keyless entry systems and other keyless entry systems and offer one or more of the following advantages:

(a) The premise-based passive keyless entry system is powered by inexpensive and commonly available household batteries, such as AA, AAA or 9 v batteries which are ubiquitous and readily available. The commonly available household batteries are also much easier to install and much less costly compared to other types of batteries.

(b) The premise-based passive keyless entry system is an independent stand-alone system, in that it does not need to be networked to a central station. It requires no external power, so there is no showing of electric wires or wire affixing appendages from alternative power sources. The costs of material and labor in wiring and installing AC power and the occasional AC power failures are eliminated and avoided entirely. Moreover, the premise-based passive keyless entry system can be deployed in areas without electricity or in areas where the wiring of electrical power or the installation of access controls are problematic or not economical.

(c) The premise-based passive keyless entry system permits the remote transponder to be detected within a prescribed "arms-length" distance (e.g., approximately ½ meter-1 meter) from the base station, thus permitting the user to gain entry in a convenient and true passive keyless fashion without requiring the user to first locate and acquire the remote transponder from the user's person or belonging and then perform an active authenticating action in order to gain entry.

(d) The remote transponder has no buttons for locking or unlocking and requires no pressing of buttons or the use of a physical key in gaining entry. The size of the remote transponder is therefore smaller than most other portable authentication devices. The remote transponder can be miniaturized and fashioned into a cylindrical shape, wherein the integrated circuitry can be constituted on a flexible PCB (printed circuit board) and coiled cylindrically inside a cylindrical housing to further reduce the remote transponder's size to improve its portability and to enhance its storage and carriage convenience.

(e) The premise-based passive keyless entry system permits the use of a single remote transponder to access multiple entry points where the convenience of entry will become more apparent as the number of entry points multiplies and exponentiates.

(f) The premise-based passive keyless entry system can be programmed with the user's own access codes by using a keypad. This permits the use of one access code to access multiple entry points. The convenience of entry will become equally apparent as the number of entry points increases.

(g) The premise-based passive keyless entry system permits the use of a single remote transponder to access multiple entry points and provides fewer opportunities to misplace the different portable authentication devices used by other keyless entry systems. Therefore, battery replacement is accordingly minimized, and there are also fewer chances of lockouts due to inoperative portable authentication devices because of dead batteries.

(h) The premise-based passive keyless entry system allows the remote transponder to be linked to the user-programmed access code thereby temporarily deactivating or permanently deleting the access code will correspondingly deactivates temporarily and invalidates permanently the associated remote transponder.

(i) The keypad grants guest access, allows alternative keyless entry without the use of the remote transponder or when the remote transponder's battery is completely drained or discharged. Additionally, the keypad also permits the use of a One-Time Access Code (OAC) that effects a single unlocking permitting a one-time entry access. The same OAC can be re-introduced repeatedly and it will again become invalid upon its subsequent first uses. The use of OAC permits the user to grant one-time access to different people seeking one-time entry without requiring the user to remember different one-time access codes.

(j) An external 9 v battery terminal can provide a means for supplying temporary backup power to the base station to allow access in the event the batteries in the base station are completely drained or discharged.

(k) An optional key and lock arrangement can provide an additional means for backup entry. An arrangement without the key and lock arrangement otherwise provides additional security wherein no bump keys or lock pickers can be used in the lock's keyway to compromise security.

The above as well as other advantages of the present embodiment will become readily apparent to those skilled in the art when considered in the light of the accompanying drawings (FIG. 1 through FIG. 9) and from the detailed descriptions below.

Figure 2:
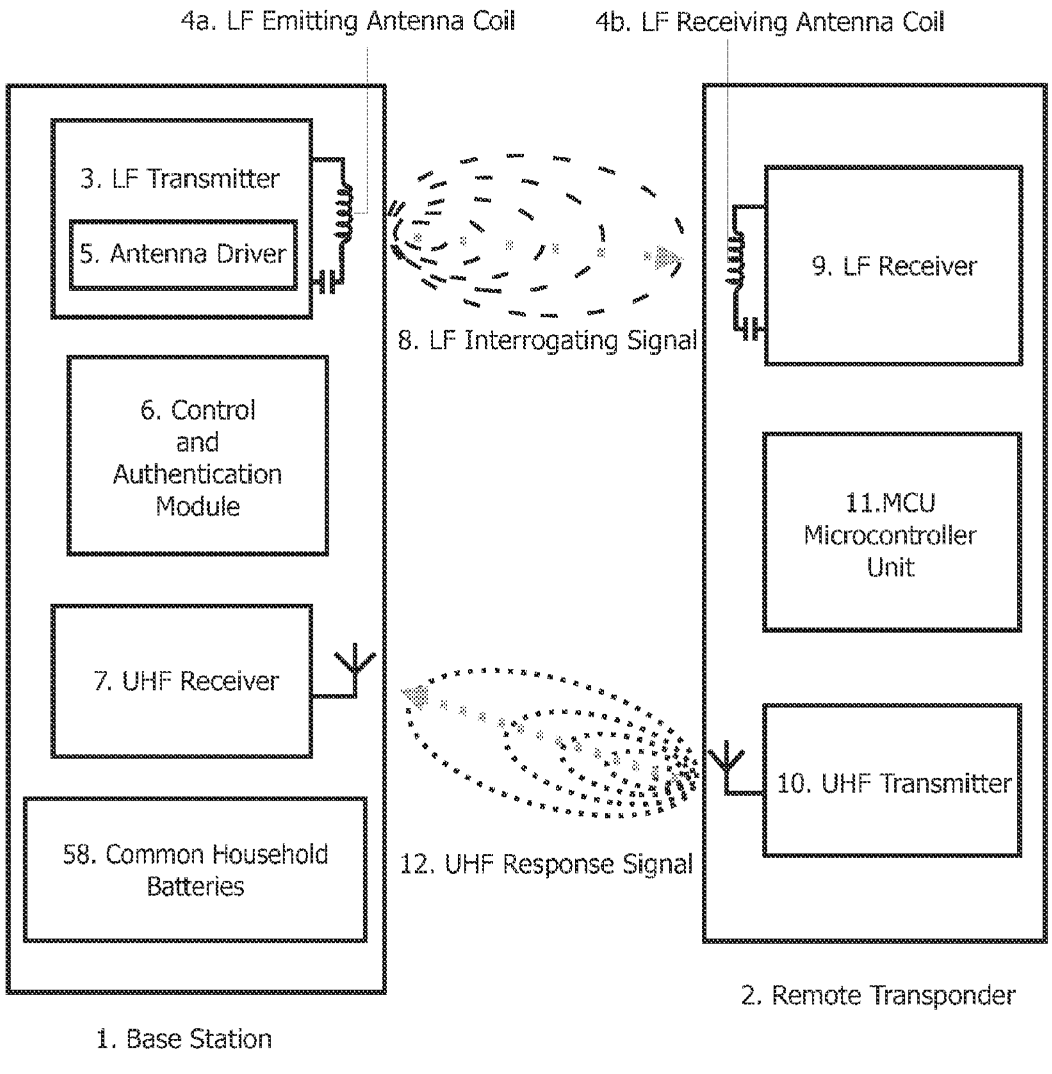
FIG. 2 is a schematic view of an exemplary embodiment of a premise-base passive keyless entry system.
Figure 3:
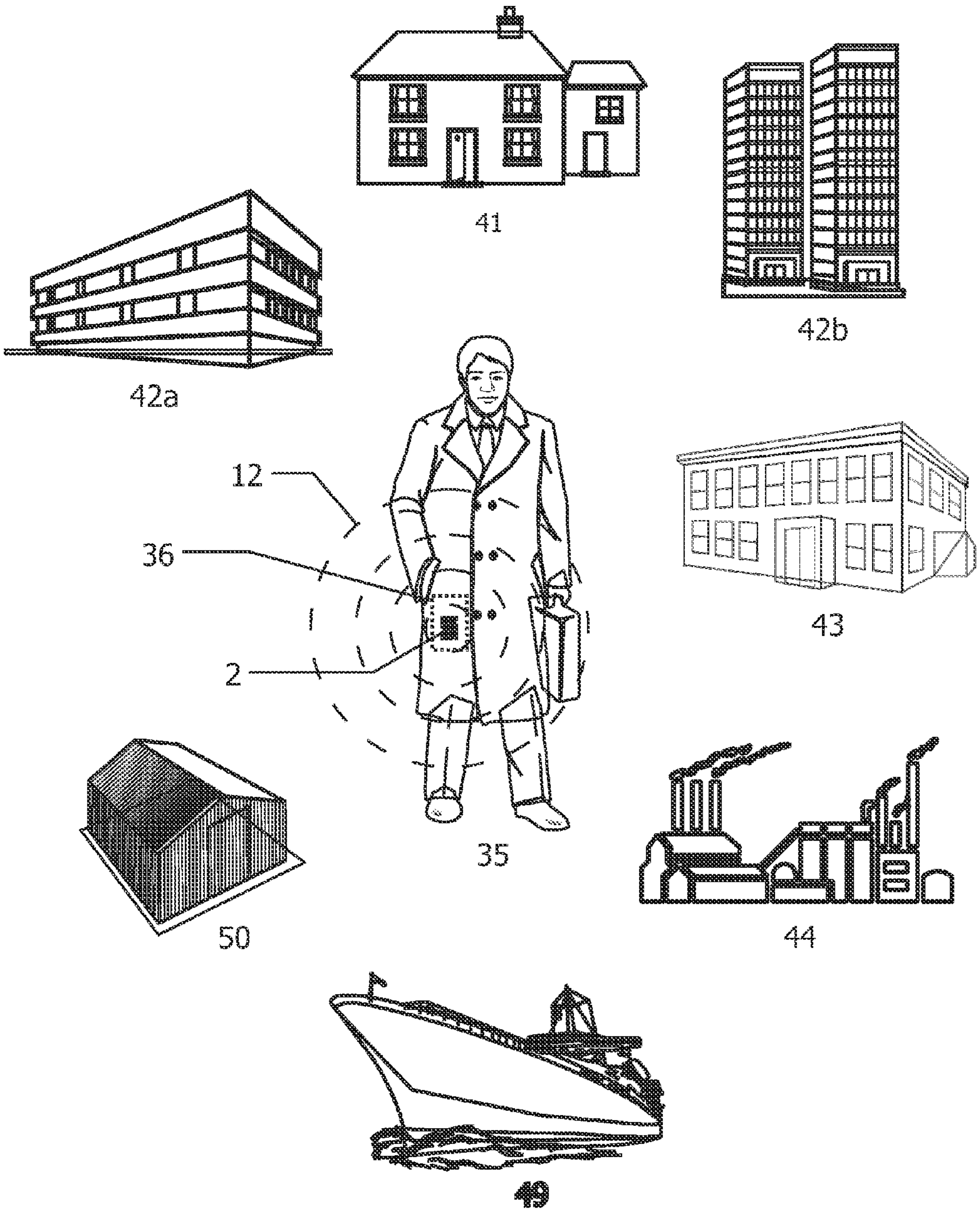
FIG. 3 is an illustrative view of possible applications of a passive keyless system where a single remote transponder can access multiple entry points.
Figure 4A:
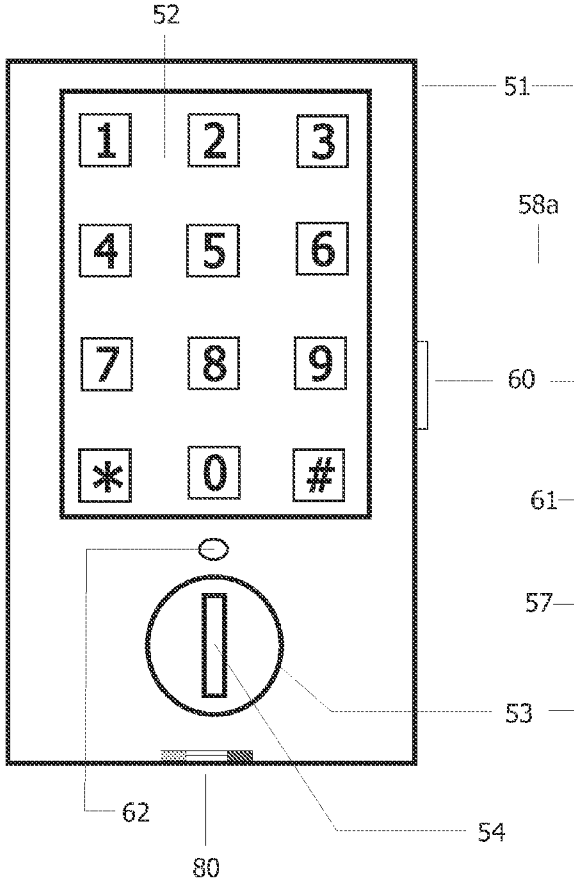
FIG. 4A is the front view of an exemplary embodiment of the base station of FIGS. 1 and 2.
Figure 4B:
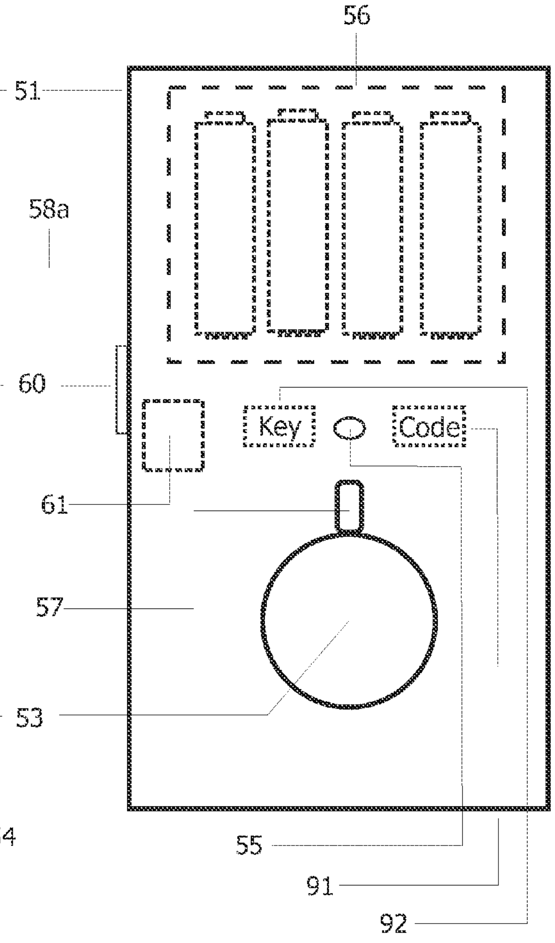
FIG. 4B is the rear view of an exemplary embodiment of the base station of FIGS. 1 and 2.
Figure 5:
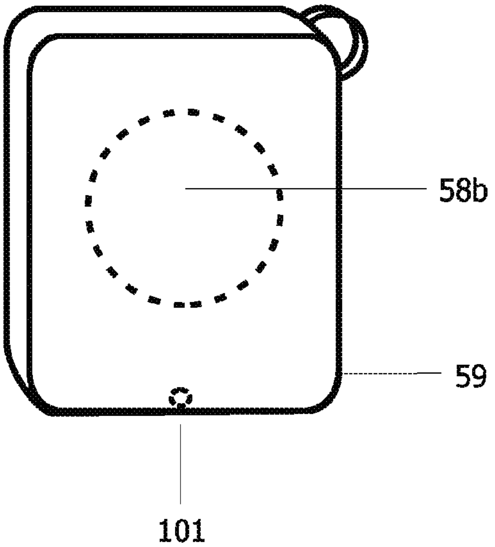
FIG. 5 is the perspective view of an exemplary embodiment of a rectangular remote transponder.
Figure 6:
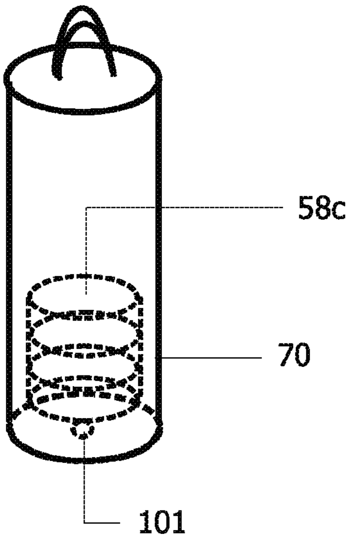
FIG. 6 is the perspective view of an exemplary embodiment of a cylindrical shape remote transponder.
Figure 7:
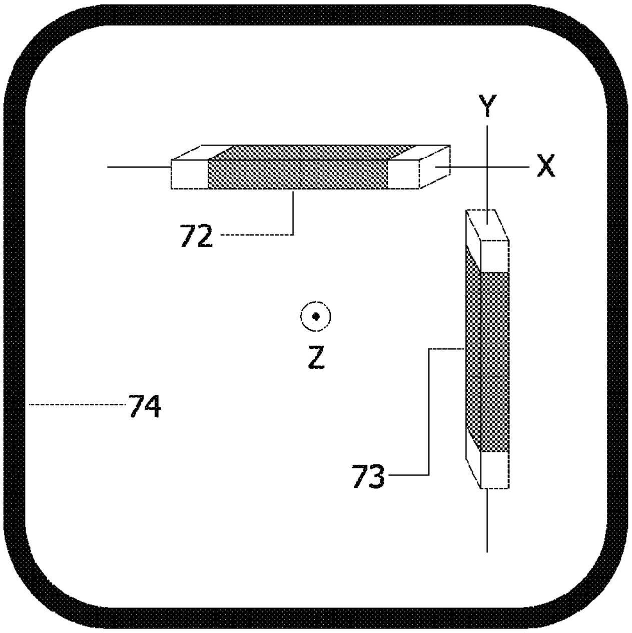
FIG. 7 is the preferred placements of three orthogonally arranged LF receiving antennas on the PCB of the remote transponder.

FIG. 1 diagrammatically illustrates how a passive keyless entry system can be deployed in providing a premise-based keyless entry solution to unlock a securing means 60 of a door 32 as a user 35 carrying the remote transponder 2 approaches the door 32. FIG. 2 schematically describes certain key components and the operation of the passive keyless entry system. FIG. 3 illustrates the possible applications of a passive keyless system where a single remote transponder 2 can access multiple entry points. FIGS. 4A & 4B shows the key components on the frontal portion and the backside portion of the base station 1. FIGS. 5 & 6 show the perspective views of an exemplary embodiment of a rectangular and a cylindrical remote transponder. FIG. 7 shows the placements and the preferred orientations of the three orthogonally arranged LF receiving antennas 72, 73 & 74 constituted on the PCB of the remote transponder 2.

In accordance with one embodiment of the invention, a premise-based passive keyless entry system comprises a base station 1 and a remote transponder 2 wherein the base station 1 and the remote transponder 2 jointly serve as communication peers establishing RF communication links between the base station 1 and the remote transponder 2 to allow access to a premise upon the authentication of the remote transponder 2 by the base station 1.

In a preferred arrangement according to the invention, as shown in FIGS. 2, 4A and 4B, the base station 1 comprises a lock housing 51 which generally encloses (i) a low frequency (LF) transmitter 3 constituting a LF emitting antenna coil **4*a* driven by an antenna driver 5, (ii) a control and authentication module 6 to control the antenna driver 5 and the LF transmitter 3 effecting the transmission of a LF interrogating signal 8 and to authenticate a response payload from the remote transponder 2, (iii) an ultra-high frequency (UHF) receiver 7, and (iv) a battery housing 56 containing a replaceable DC power supply 58*a* such as common household batteries (e.g., AA batteries, AAA batteries. etc). The DC power supply 58*a* powers the base station's circuitries and RF communication elements and drives an electrified means such as a motor 61 or solenoid used to automatically unlock a securing means 60 arranged on the base station 1. The securing means 60** can be a deadbolt, latch bolt or an electrified or a magnetic locking mechanism.

As shown in FIG. 4A, the base station 1 comprises a digital keypad 52, which is connected to and interfaces with the control and authentication module 6 for entering, registering and changing of the access codes and for programming the base station's various functions. The digital keypad 52 further comprises a volatile memory (e.g., Random Access Memory "RAM") and a non-volatile memory (e.g. flash, any type of Erasable Programmable Read Only Memory, etc.) that permit storage and retention of access codes and programming and operation instructions. Besides the digital keypad 52, an optional keyway 54 may be provided as an additional means for alternative backup entry by inserting a key into the keyway 54 and turning the key to manipulate the securing means 60 into an unlocked state.

As further shown in FIG. 4A, the base station 1 also comprises an external 9 v battery terminal 80 and a door lock status indicator 62. The external 9 v battery terminal 80 provides a means for supplying temporary backup power to allow access in the event the batteries in the base station 1 are completely drained or discharged. The door lock status indicator 62 shows the current lock status to confirm the proper entry of the correct access codes and the proper entering of the programming keystroke sequences.

As shown in FIG. 4B, the base station 1 comprises a battery level indicator 55, a thumb turn 57 to manually lock or unlock the securing means 60, an access code registration button 91, and a transponder registration button 92. The access code registration button 91 is used for registering, changing or deleting of access codes while the transponder registration button 92 is used for pairing the base station 1 with remote transponders 2.

To increase security, the access code registration button 91 and the transponder registration button 92 are placed inside the base station's backside portion of the lock housing 51. The base station 1 is further constituted with a factory set Master Code that can be changed by the user. The factory set Master Code can be restored by a registered user in the event that the user forgets the current Master Code. The Master Code permits the unlocking of the securing means 60 under all conditions and the Master Code is required when pairing the base station 1 with new remote transponders, registering, changing or deleting user access codes, altering the base station's default functions or programming additional system functions and features.

The remote transponder 2 is a wireless automatic receiver-transmitter comprising a low frequency (LF) receiver 9 namely, according to one embodiment, a three dimensional LF receiver that comprises a plurality of orthogonally arranged antenna coils, preferably three orthogonally arranged antenna coils. Each antenna coil has its own external LC (inductor-capacitor) resonant circuit for tuning its frequency to the base station's LF transmitter frequency and is communicatively coupled to the base station's LF emitting antenna coil **4*a* for receiving the LF interrogating signals 8 from the base station 1. The input voltage that is generated by the external LC resonant antenna circuit is maximized when the LC circuit is tuned precisely to the frequency of the base station's LF interrogating signal 8. This precise tuning of the remote transponder's LC resonant antenna circuits' frequencies has the same effect of maximizing the proximity detection distance between the remote transponder 2 and the base station 1**.

As shown in FIG. 7, two of the three orthogonally arranged LF receiving transponder antennas 72 & 73 preferably ferrite-core antennas arranged in the X and Y axes respectively and the third orthogonally arranged LF receiving transponder antenna 74 preferably an air-core antenna arranged in the z-axis are oriented perpendicular to each other. Such an orthogonal arrangement of the three LF receiving transponder antennas 72, 73 & 74 increases the probability that at any given incident during operation at least one of the three LF receiving transponder antennas faces toward the base station's LF emitting antenna coil 4*a*, and thus, reduces the probability of missing signals due to the properties of antenna directionality. The ferrite-core antennas 72 & 73 arranged in the X and Y axes should be separated as far as possible to reduce the mutual coupling between them and the air-core antenna 74 should be kept as large as possible given the space available on the PCB of the remote transponder 2.

Referring back to FIG. 2, the remote transponder 2 further comprises an UHF transmitter 10 and a MCU 11 (microcontroller unit such as the PIC16F639 by Microchip Technology, Inc., Chandler, Ariz., USA, which includes a microcontroller and a three channel LF Analog Front End for low frequency sensing and bidirectional communication).

As shown in FIGS. 2 and 7, the LF receiver 9 receives a properly predefined LF interrogating signal 8, preferably in the 125 KHz (kilohertz) range, from the base station 1; the LF interrogating signal 8 from the base station 1 is detected by the three orthogonally arranged LF receiving antennas 72, 73 & 74 independently and the detected signals are summed afterwards and processed by the MCU 11. The MCU 11 evaluates and authenticates the detected LF interrogating signal 8 and uses the UHF transmitter 10 to transmit a predetermined encrypted identifying UHF response signal 12 on a different frequency, preferably in the 434 MHz range (or 13.56 MHz range), in response to the received LF interrogation signal 8 from the base station 1.

As shown in FIGS. 5 & 6, the remote transponder 2 comprises a means such as a tiny recessed button 101 used in conjunction with the transponder registration button 92 on the base station 1 (FIG. 4B) for pairing with the base station 1. The tip of a stylus or a paper clip can be used to actuate the tiny recessed button 101. It is noted that the remote transponder 2 comprises no buttons for the purposes of locking and unlocking. Hence, the preferred mode of entry is truly passive and keyless and requires no active or interactive actions by the user in order to gain entry.

The remote transponder 2 preferably powered by a small lithium 3 v coin cell battery 58*b* constituted inside the rectangular housing 59 (FIG. 5) can be miniaturized and fashioned into a cylindrical shape (FIG. 6) wherein the remote transponder's integrated circuitry can be constituted on a flexible PCB and coiled cylindrically inside a cylindrical housing 70. Depending on the size of the remote transmitter 2, smaller micro batteries 58*c* configured in series (FIG. 6) may be used to power the remote transponder 2 and further reduce its size. This effectively improves its portability and enhances its storage and carriage convenience.

The control and authentication module 6 is processing logic (e.g., processor, microcontroller, application specific integrated circuit, or any other logic with data processing capability) that operates in conjunction with the LF transmitter 3 to generate a low frequency (LF) magnetic field, namely a LF interrogating signal 8 (e.g., preferably within the 125 KHz range) when a user 35 carrying the remote transponder 2 approaches within the prescribed arms-length distance (e.g., ½ to 1 meter) from the base station 1 and engages an unlocking mechanism 53 (e.g. a door knob/lever) arranged on the base station 1 (FIGS. 4A, 8A&8B and 9A&9B). Otherwise, the base station 1 refrains from transmitting the LF interrogating signal 8 in order to conserve power.

The engaging of the unlocking mechanism 53 by the user is of such a manner that as if the door were unlocked. The user is not required to locate and acquire the remote transponder 2. No active authenticating action is required in order to gain entry other than the one continuous motion by the user grabbing the doorknob or the door lever and pushing through the door that the user would normally do regardless of the state of the security means 60.

More specifically, as illustrative embodiment, when the unlocking mechanism 53 is implemented with an electromechanical switch 102 (FIGS. 9A&9B), the base station 1 transmits the LF interrogating signal 8 when the user squeezes the unlocking mechanism 53. As another illustrative embodiment, when the unlocking mechanism 53 is implemented with a touch sensor, the base station 1 transmits the LF interrogating signal 8 when the user makes physical contact with the touch sensor.

The LF receiver 9 (FIG. 2) in conjunction with the MCU (microcontroller unit) 11 on the remote transponder 2 receives the LF interrogating signal 8 from the base station 1, measures the received LF interrogating signal strength and the base station's 1 identity on the three orthogonal X, Y, Z axes of the remote transponder's LF receiver antenna coils 72, 73 & 74 (FIG. 7) and interprets the LF interrogating signals 8, and returns an encrypted identifying UHF response signal 12, preferably a UHF signal approximately in the 434 MHz range (or 13.56 MHz range), using the UHF transmitter 10 on the remote transponder 2. The UHF receiver 7 on the base station 1 receives the encrypted identifying UHF response signal 12 and routes the UHF response signal 12 to the control and authentication module 6 for authentication. The base station's control and authentication module 6 deciphers the encrypted UHF response signal 12 and places the securing means 60 arranged on the base station 1 into an unlocked state upon authentication of the remote transponder's UHF response signal 12. Manipulation of the securing means 60 into an unlocked state may be accomplished by actuating a motor 61 or solenoid to rotate or retract a deadbolt or a latch bolt or by unlatching an electrified or a magnetic locking mechanism on the base station 1.

Figure 8A:
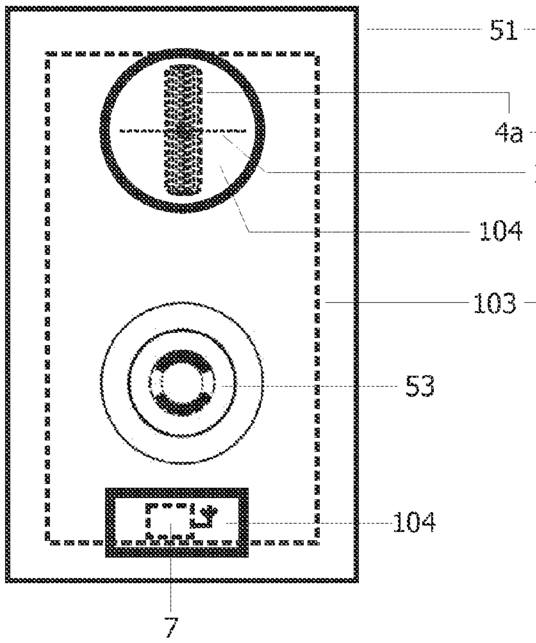
FIG. 8A is the front view of an exemplary embodiment of the placements and situations of the LF communication elements arranged on the base station of a passive keyless entry system.
Figure 8B:
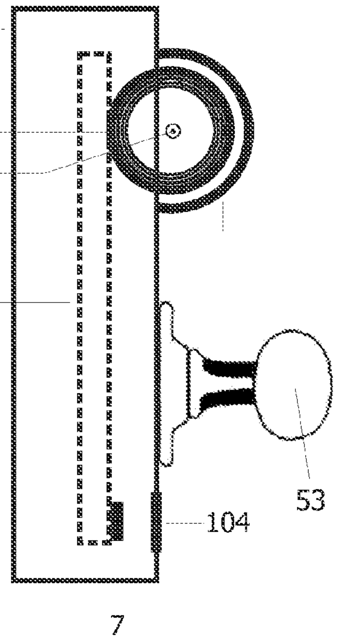
FIG. 8B is the side view of an exemplary embodiment of the placements and situations of the LF communication elements arranged on the base station of a passive keyless entry system.
Figure 9A:
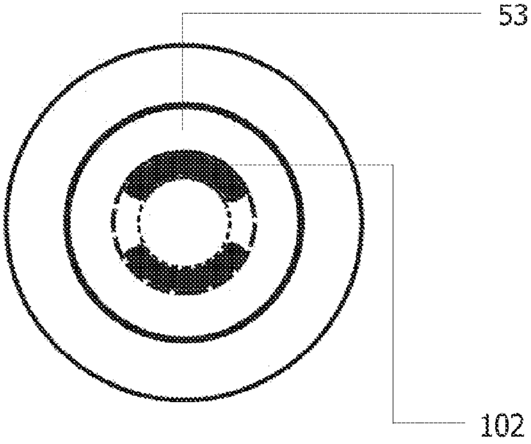
FIG. 9A is the front view of an exemplary embodiment of an unlocking mechanism with an incorporated electromechanical switch.
Figure 9B:
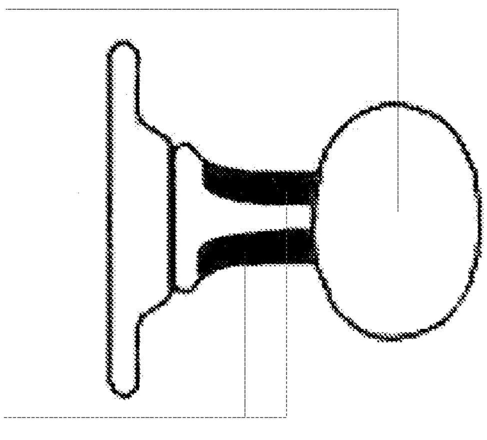
FIG. 9B is the side view of an exemplary embodiment of an unlocking mechanism with an incorporated electromechanical switch.

According to one arrangement of the invention, to circumvent and to overcome the shielding of the transmissions and receptions of the RF communications between the base station 1 and the remote transponder 2, a specific portion of the base station's lock housing 51 can be constituted with non-RF shielding (e.g., non-ferrous or non-electromagnetic) material that permits RF signal propagation, transmission or reception while the remaining portions of the lock housing 51 are constituted with tamper resistant ferromagnetic or electromagnetic RF shielding material for maintaining system integrity. The RF transmission and reception elements are oriented and situated in areas of the lock housing constituted with non-RF shielding material. More specifically, as shown in FIGS. 8A & 8B, the LF emitting antenna coil 4*a* and the UHF receiver 7 can be constituted on the base station's printed circuit board (PCB) 103 and situated in such a way that the LF emitting antenna coil 4*a* and the UHF receiver 7 are partially exposed or partially protruding out of an area of the surface of the base station's enclosure immediately above or lateral to the LF emitting antenna coil 4*a* and the UHF receiver 7. Such exposed areas or partially protruding spaces can be encapsulated with tamper resistant encapsulants 104 such as ABS plastic or Lexan, a transparent polycarbonate of high impact strength used for cockpit canopies and bullet resistant windows, to resist impacts or tampering and at the same time allowing the efficient RF communications between the base station 1 and the remote transponder 2.

It is contemplated that the LF emitting antenna coil 4*a* can preferably be constituted in such a way that the LF emitting antenna coil 4*a* is oriented perpendicular to the base station's PCB 103 (FIGS. 8A&8B) and protruding directly above the surface of the enclosure. Furthermore, the LF emitting antenna coil 4*a* can preferably be arranged in such a way that the LF emitting antenna coil's axis 105 is oriented in the horizontal position (opposed to any other spatial orientations) generating a latitudinal magnetic field pattern in the x-axis covering a wider spatial area along the x-axis where the remote transponder 2 is more likely be positioned as the user carrying the remote transponder 2 approaches the base station 1.

Typically, a user carries the remote transponder 2 somewhere near or not too distant from the middle section of the user's body. The base station 1 can preferably be arranged at a height similar to the average height of the user's middle section so that arranging the LF emitting antenna coil 4*a* with the LF emitting antenna coil's axis 105 arranged in the horizontal position will produce the widest LF interrogating signal 8 spatial coverage latitudinally and will increase the probability that the base station's LF interrogating signal 8 be captured by the remote transponder's LF receiving antenna coils 4*b*. Such an arrangement will lessen and reduce the Faraday's shielding effects of the transmission of the LF interrogating signal 8 by the base station 1 and the reception of the UHF response signal 12 from the remote transponder 2 to such a level as to permit the "arms-length" distance proximity detection of the remote transponder 2 by the base station 1. This arrangement enables a user carrying the remote transponder 2 to gain entry in a true convenient and passive keyless fashion without requiring the user to first locate and acquire the remote transponder 2 and then perform an active authenticating action in order to gain entry. Tuning the remote transponder's LC resonant antenna circuits to the precise frequency of the base station's LF interrogating signal 8 will further maximize the proximity detection distance of the premise-based passive keyless entry system.

The bilateral RF communication transmissions between the base station 1 and the remote transponder 2 can be encrypted and decrypted according to known techniques (e.g., AES-128 bit) via software or by a hardware crypto module, decoders such as the KEELOQ® code hopping decoder implemented on the PIC microcontroller (PIC16CE624) by Microchip Technology, Inc., Chandler, Ariz., USA or other crypto mechanisms can be implemented into the base station's hardware or embedded on the remote transponder's MCU 11 for increased security.

The integrated circuits and the RF communication and authentication apparatuses of the base station 1 and the remote transponder 2 such as the LF transmitter 3, the LF antenna driver 5 and the control and authentication module 6 of the base station 1 and the remote transponder's LF receiver 9 and MCU (Microcontroller Unit) 11 or similar function ICs and modules can be adapted from the ATA 5278 Antenna Driver, the ATA 5282 LF Receiver and the ATtiny44 Ultra Low-Power Microcontroller from Atmel Corporation of San Jose, Calif., USA or similar communication and microcontroller modules such as the PIC16F639 MCU by Microchip Technology, Inc., Chandler, Ariz., USA to realize the RF communications and authentications between the base station 1 and the remote transponder 2. Semiconductor companies such as NXP Semiconductors of Eindhoven, The Netherlands, TEMIC Semiconductor GmbH of Heilbronn, Germany and other semiconductor companies also provide similar RF communications and control modules that a person skilled in the art using known techniques can use and fashion the delineated protocols to realize the same in adapting the premise-based passive keyless entry system to achieve a convenient and passive keyless entry solution.

In another preferred embodiment, a removable DC power supply using inexpensive and common household batteries (e.g., AA batteries) is constituted to power the base station's integrated circuits, control and authentication module 6 and RF communication elements enabling the transmission of the LF interrogating signal 8 and the reception and authentication of the returned UHF response signal 12. The DC power supply is also used to unlock the securing means 60 on the base station 1 by actuating a motor 61 or solenoid situated inside the base station's lock housing 51 to rotate or retract the securing means 60 such as a deadbolt or a latch bolt or by electronically unlatching an electrified or a magnetic locking mechanism.

Another arrangement of an embodiment provides a keypad 52 on the base station 1, which permits an alternative entry without the use of the remote transponder 2. This embodiment allows a user to program the user's own access codes. Hence, using the transponder registration button 92 (FIG. 4B) situated inside the backside portion of the base station's lock housing 51 together with the tiny recessed button 101 (FIG. 5 or 6) situated on the remote transponder 2, the base station 1 can be paired with multiple remote transponders each having an unique ID, or be paired with a single remote transponder 2 permitting the use of a single remote transponder 2 to access multiple base stations 1. As a result, a user can gain convenient entries to multiple access points by the use of a single remote transponder 2 or by the use of a single access code.

As illustrated in FIG. 3, a user can access the user's residence 41, business 42*a* or office building 42*b*, warehouse 43 or production facility 44, cabin in a watercraft or sea vessel 49, tool sheds 50, swimming pool gates or any structures, openings or storage spaces to be secured against unauthorized access such as frequently accessed valuables storage cages, gun safes, walk-in freezers or lockers, etc., in the same city or in a different country, the user will have the convenience of not having to locate and acquire, and carry and use different conventional keys, multiple key fobs, key cards or other portable access control devices or perform any authentication actions in order to gain entry to the secured places. The advantage of the use of a single remote transponder to allow entries to multiple access points significantly improves the benefits of the conventional PKE systems where only one portable access control device is paired with a corresponding base station such as the vehicular PKE systems where one key fob can be used with only one specifically paired vehicle.

To increase security and restrict unintended access code attempts, the base station 1 can initiate a non-linear growing timeout scheme where the base station 1 timeouts between unsuccessful access code attempts after a small number of unsuccessful access code attempts, preferably four or less unsuccessful access code attempts before the growing timeout scheme is initiated. Each timeout duration between unsuccessful access code attempts can grow in an exponential fashion as to disallow the continuous guessing of the correct entry access code. For instance, as an illustrative embodiment, the base station 1 can timeout for 30, 60, 120, 240, and 480 . . . seconds respectively after the $4^{th}$, $5^{th}$, $6^{th}$, $7^{th}$ and $8^{th}$ . . . failed attempts and can timeout for 480 seconds (8 minutes) or longer for each unsuccessful attempt after the $8^{th}$ failed attempt. Alternatively, as another illustrative embodiment, the base station 1 can timeout in a continual and exponential fashion with each subsequent timeout duration substantially longer than the previous timeout period. An alarm tone/beep will sound and a red LED will come on for each subsequent unsuccessful attempt after the $4^{th}$ failed attempt.

An arrangement of the present embodiment incorporates a number of useful functions and features that includes a One-Time Access Code (OAC) that grants a single unlocking permitting a one-time entry access. The OAC will become invalid after its first unlocking. A user can set up a number of multi-digits OACs, where the same multi-digits OAC can be re-introduced repeatedly and it will again become invalid upon its subsequent first uses. Placing the securing means 60 into an unlocked state using the OAC will instantly use up the one-time access privilege and will immediately invalidate the OAC; thus having the same effect as deleting that particular used OAC.

In another preferred embodiment, the remote transponder 2 can be linked to a user-programmed access code thereby temporarily deactivating or permanently deleting the access code stored in the non-volatile memory will correspondingly deactivate temporarily and invalidate permanently the associated remote transponder 2.

It is further contemplated that, in order to extend the life of the remote transponder battery, an ultra-low power MCU 11 may be employed within the remote transponder 2 such as PIC16F639 MCU by Microchip Technology, Inc., Chandler, Ariz., USA wherein the analog front-end section of the MCU comprising a dynamically reconfigurable output enable filter that can allow the MCU to wake-up to the wanted LF interrogating signal 8 only but ignore all other unwanted signals.

The above described passive keyless entry system that is adapted particularly for premise entry and is specifically powered by inexpensive and common household batteries is not limited to securing entries to premises. It can be used to secure any places, venues or spaces where the premise-based passive keyless entry system can be arranged or situated. The premise-based passive keyless entry system can be implemented to secure barriers prohibiting unauthorized entry into a premise, which may include, but is not limited or restricted to any type of building, fenced area, watercraft, marine vessels, mobile homes or recreation vehicles. The present arrangement can be linked to an alarm system to enhance security or be linked to an access control network where external power and additional access control functions such as simultaneous locking and unlocking of multiple entry points and emailing or texting of access data and lock status to web-enabled devices can be added. The present arrangement can also be incorporated with smart-home systems where various smart-home control functions such as unlocking the door and turning on the lights can be communicated wirelessly by the emerging Z-Wave and ZigBee types of interoperable wireless networking technologies.

After examining and considering the detailed descriptions of the present invention and in the light of the accompanying drawings, the advantages of one or more aspects of the present invention are evident. A user of the present invention will have a more convenient mode of entry to a premise by not having to insert a key in a door lock's keyway, not having to locate and acquire an access control device from the user's person or belonging, not having to press a button on a key fob, not having to swipe an access control card through a card reader, not having to place a smart card, chip card, token or portable data carrier in close proximity to an authorizing station, not having to carry and use multiple portable authenticating devices in order to access multiple entry points; multiple base stations can be paired with a single remote transponder and a user can program his or hers own access codes thus permitting the use of a single remote transponder or the use of a single access code to gain entries to multiple entry points; there are fewer opportunities to misplace different portable authentication devices and much less needs to replace all the batteries of the different portable authentication devices; there is no need to memorize multiple entry codes, guest entry is possible; the external keypad can be used to grant a one-time guest access or provide limited entry privileges; user entry privileges can be revoked at any time, and keyless entry is possible without the use of the remote transponder; no locksmiths or security professionals are needed if the remote transponder is misplaced or stolen or if the access code is compromised, since the remote transponder can be linked to a user-programmed access code; a user can rectify such security breaches in a timely manner with little or no costs by using the keypad to temporarily deactivate or permanently delete the compromised access code thereby temporarily deactivates and permanently invalidates the correspondingly linked remote transponder; there is no wiring required, no external power needed and no installation expenditures and maintenance costs; the batteries used in the present invention are inexpensive and easily available and entry is possible even if the battery in the remote transponder is completely discharged or in the event the base station's batteries are completely drained. In addition, the remote transponder can be miniaturized to improve its portability and enhance its storage and carriage convenience and an optional key and lock arrangement can provide an additional means of backup entry in the event that all the system's electronics and RF communication elements fail and both the batteries in the base station and the remote transponder are completely drained or discharged and with simultaneous power blackouts and where no spare batteries are available; an arrangement without the key and lock arrangement otherwise provides additional security wherein no bump keys or lock pickers can be used in the lock's keyway to compromise security.

Operation

In operation, a user 35 (FIG. 1) carrying a remote transponder 2 on the user's person (e.g., in a pants pocket 36 or inside the user's belonging being carried such as a purse), approaches within the prescribed arms-length distance (e.g. one-half to one meter) from a premise opening or door 32. Upon engaging the unlocking mechanism 53 (FIGS. 4A, 8A&8B, 9A&9B), which could incorporate an electromechanical switch 102, or could function as a touch sensor, the base station 1 arranged on the door 32 using the LF transmitter 3 transmits a LF interrogating signal 8 seeking a paired or authorized remote transponder 2.

The LF receiver 9 on the remote transponder 2 receives the LF interrogating signal 8, and together with the MCU 11 on the remote transponder 2, evaluates the received LF interrogating signal 8. Upon validation of the interrogating signal 8, the remote transponder 2 uses the UHF transmitter 10 to return an encrypted identifying UHF response signal 12 to the base station 1.

The UHF receiver 7 on the base station 1 receives the returned UHF response signal 12 and sends it to the control and authentication module 6, and upon authentication of the remote responder 2, the base station 1 unlocks the securing means 60 (FIG. 4A) situated inside the base station's lock housing 51 by actuating a motor 61 or solenoid to rotate or retract a deadbolt or a latch bolt or by electronically unlatching an electrified or a magnetic locking mechanism.

Herein, the base station 1 is powered by using easily available common household batteries (e.g., AA batteries, AAA batteries, 9V batteries, etc.) and can be paired with the remote transponder 2 using the transponder registration button 92 (FIG. 4B) situated inside the backside portion of the base station's lock housing 51 together with the tiny recessed button 101 (FIG. 5 or 6) situated on the remote transponder 2.

A user can program the user's own access codes, change or delete existing access codes by using the digital keypad 52 situated on the frontal portion of the base station 1 together with the access code registration button 91 (FIG. 4B) situated inside the backside portion of the base station's lock housing 51. The digital keypad 52 also provides a means for entering various system functions, grants guest access and provides an alternative means of entry without the use of the remote transponder 2.

According to one embodiment of the invention, multiple base stations 1 may be paired to a single remote transponder 2, which allows for the use of a single remote transponder 2 to unlock multiple entry points. A user can also access the same or other entry points by the use of a single access code by programming all the base stations with the same access code.

Herein, the remote transponder 2 comprises no buttons and a user carrying the remote transponder 2 is not required to perform any actions in gaining entry other than by a single continuous motion of grabbing the unlocking mechanism 53 (FIGS. 4A, 8A&8B and 9A&9B) and opening the door. An external 9 v battery terminal 80 (FIG. 4A) can be used to provide a means for supplying temporary backup power to the base station 1 to allow access in the event the batteries 58*a* in the base station 1 are completely drained or discharged. An optional key and lock arrangement with a keyway 54 can also provide an additional means for alternative backup entry.

While the above description contains much specificity, these specificities should not be construed as limitations on the scope of any embodiment, but rather as an exemplification of various embodiments thereof. Many other ramifications and variations are possible within the delineations of the various embodiments. Accordingly, the scope of the embodiments should be determined by the stated claims and their legal equivalents, and not by the examples given.

While certain exemplary embodiments have been described and shown in the accompanying drawings, it is to be understood that such embodiments are merely illustrative of and not restrictive on the broad invention; and that this invention is not limited to the specific constructions and arrangements shown and described, since various other modifications may occur to those of ordinary skill in the art. The description is thus to be regarded as illustrative instead of limiting.

What is claimed is:

1. A base station comprising:

a housing including a first portion being made of a first material and a second portion being made of a second material different than the first material, the second material having a composition to shield radio frequency (RF) signaling while the first material having a composition that allows for the propagation, transmission or reception of RF signaling;

a power source;

a printed circuit board; and a low frequency (LF) transmitter coupled to the power source and mounted on the printed circuit board, the LF transmitter comprises a LF emitting antenna coil positioned both perpendicular to the printed circuit board and behind the first material of the housing and having a center axis oriented in a horizontal orientation, the LF antenna coil transmitting an interrogating signal upon detecting a user within a prescribed arms-length distance from the base station.

2. The base station of claim 1, wherein the prescribed arms-length distance is greater than a half of a meter and less than two meters.

3. The base station of claim 1, wherein the power source is a removable direct current (DC) power source.

4. The base station of claim 3, wherein the power source is one or more batteries.

5. The base station of claim 1, wherein the transmitter is adapted to transmit the interrogating signal in response to the user engaging an unlocking mechanism mounted externally on the housing.

6. The base station of claim 5, wherein the unlocking mechanism is a doorknob or a door lever.

7. The base station of claim 1, wherein the interrogating signal is a low frequency RF signal in a frequency range of approximately 125 kilohertz.

8. The base station of claim 7, further comprising:

a receiver coupled to the power source and mounted on the printed circuit board, the receiver is adapted to receive an ultra-high frequency RF signal that is in response to the interrogating signal, the ultra-high frequency RF signal being at least hundred times greater in frequency than the interrogating signal.

9. The base station of claim 8, wherein the ultra-high frequency RF signal is in a frequency range 434 megahertz.

10. The base station of claim 8, further comprising a control and authentication module is processing logic that is adapted to (i) control an antenna driver of the LF transmitter that generates the LF interrogating signal and (ii) decipher and authenticate the UHF response signal.

11. The base station of claim 9 further comprising a motor or solenoid for actuating a securing means for placement into a first state where the securing means extends from the housing and for actuating the securing means for placement into a second state where the securing means retreats into the housing upon authentication of the UHF response signal.

12. The base station of claim 1 further comprising means for supplying external backup power if the power source is completely drained or discharged.

13. The base station of claim 1, wherein the second material is a tamper resistant ferromagnetic or electromagnetic RF shielding material.

14. The base station of claim 1 further comprising:

a keypad arranged on the housing; and a control module being processing logic that is adapted to implement a non-linear growing or exponential timeout scheme where intervals between successive unsuccessful access code attempts on the keypad increases.

15. A method for controlling a locking state of a door by a base station in a passive keyless entry system, the method comprising:

initially detecting a user only within a prescribed distance from the base station, the prescribed distance ranging between 0.5 and 1 meter, wherein detecting of the user includes detecting the user coming into contact with an unlocking mechanism being part of the base station, the base station comprises a housing that includes a first portion being made of a first material and a second portion being made of a second material different than the first material, the second material having a composition to shield radio frequency (RF) signaling while the first material having a composition that allows for the propagation, transmission or reception of RF signaling;

transmitting a low frequency (LF) interrogating signal when the user is detected;

receiving an ultra-high frequency (UHF) response signal that is transmitted in response to the interrogating signal;

authenticating the UHF response signal; and selectively placing a securing means of the base station into an unlocked state when the response signal is authenticated.

* * * * *